| United States Patent [19] | [11] Patent Number: 5,028,334 |
| Rickelton et al. | [45] Date of Patent: Jul. 2, 1991 |

[54] SELECTIVE RECOVERY OF TIN BY SOLVENT EXTRACTION USING BRANCHED TERTIARY PHOSPHINE OXIDES

[75] Inventors: William A. Rickelton, Niagara Falls, Canada; Richard J. Boyle, Somerville, N.J.

[73] Assignee: American Cyanamid Company, Me.

[21] Appl. No.: 382,375

[22] Filed: Jul. 20, 1989

Related U.S. Application Data

[62] Division of Ser. No. 72,941, Jul. 13, 1987, abandoned.

[51] Int. Cl.$^5$ .............................................. B01D 11/00
[52] U.S. Cl. ..................................... 210/638; 210/639
[58] Field of Search ....................... 210/634, 638, 639; 423/89, 98

[56] References Cited

U.S. PATENT DOCUMENTS

| 3,556,305 | 1/1971 | Shorr | 210/490 |
| 3,850,203 | 11/1974 | Shobert | 210/490 X |
| 3,957,504 | 5/1976 | Hu et al. | 210/638 X |
| 3,993,566 | 11/1976 | Goldberg et al. | 210/321.84 |
| 4,755,299 | 7/1988 | Bruschke | 210/321.84 X |

*Primary Examiner*—Frank Spear

[57] ABSTRACT

Disclosed are processes for the selective extraction of tin from aqueous acidic solutions bearing tin and other metal cations. Branched tertiary phosphine oxides comprising at least two branches per alkyl group show higher extraction coefficients, E, for tin than other metals, e.g. zinc (III), iron (II), iron (III), copper (II) and lead (II). Novel compositions for selectively extracting tin comprising combinations of symmetrical branched phosphine oxides and unsymmetrical phosphine oxides are also disclosed.

12 Claims, No Drawings

SELECTIVE RECOVERY OF TIN BY SOLVENT EXTRACTION USING BRANCHED TERTIARY PHOSPHINE OXIDES

This is a divisional of co-pending application Ser. No. 07/072,941, filed on July 13, 1987, now abandoned.

This invention relates to a process for the selective recovery of tin from acidic leach solutions by solvent extraction. More particularly, it pertains to the use of branched tertiary phosphine oxides alone, or in further combination with unsymmetrical tertiary phosphine oxides to extract selectively tin from acidic solutions containing other metal cations, and to extractant compositions comprising the branched and unsymmetrical phosphine oxides in combination.

BACKGROUND OF THE INVENTION

The recovery of tin from aqueous solutions using tri-n-octylphosphine oxide (TOPO) as a solvent extraction reagent is well-known.

White and Ross in "Separations by Solvent Extraction with Tri-n-Octylphosphine Oxide", National Research Council, Subcommittee on Radiochemistry, Technical Information Center, Oak Ridge National Laboratory, 1961, report that tin is readily extracted from dilute acid chloride solutions by using TOPO. There is no suggestion in this publication, however, that tin can be selectively and efficiently extracted from acidic solutions to the exclusion of other metal cations by modifying, e.g., by branching, the alkyl substituents in the phosphine oxide. Moreover, it is stated in this publication on page 4 that no suitable method has been developed for the stripping of tin (IV).

Ross and White, "Analytical Chemistry," v.33(3), March 1961, pp. 424–427, also disclose the use of tris (2-ethylhexyl) phosphine oxide (TEHPO) to extract tin from acidic chloride-sulfate solutions. It is stated that ten additional elements are extracted with TEHPO. Among these elements, antimony, gallium, iron and molybdenum are extracted in an amount sufficient to interfere with the determination of tin although back-washing can eliminate or reduce these interferences. This article does not teach that the extraction of tin can be selectively enhanced to the exclusion of other metals by using phosphine oxides substituted with branched alkyl substituents having at least two branches per saturated alkyl.

Heddur and Khopkar, "Analyst," November 1984, Vol. 109, pp. 1493-1495, disclose that tin is separated from 2 M hydrochloric acid by extraction chromatography using TOPO as the stationary phase on a column of silica gel. They further disclose that the separation of tin from a larger number of elements in binary or multicomponent mixtures can be carried out by exploiting the differences in their extractability with TOPO at various acidities of hydrochloric acid, e.g., 0.1 to 3 molar. There is no teaching or suggestion, however, that the selective extraction of tin can be enhanced by increasing the degree of branching in the phosphine oxide substituents.

Phosphine oxides have been proposed to extract halogenated hydrocarbons, alcohols, and rhenium metal. See, e.g., U.S. Pat. No. 4,470,909; U.S. Pat. No. 4,544,779; and European Pat. Appl. No. 113,912.

In U.S. Pat. No. 4,470,909, Bright discloses a method for the extraction of halogenated hydrocarbons, e.g., polychlorinated biphenyls (PCBs) from aqueous solutions using as the extractant phosphine oxides on inert solid supports. Such phosphine oxides can be linear or branched, e.g., tris (2,4,4-trimethylpentyl) phosphine oxide. Although the solvent systems taught by Bright are effective in the removal of halogenated hydrocarbons, there is no suggestion that they could be used to extract tin from acidic solutions bearing other metal cations.

In U.S. Pat. No. 4,544,779, Bright discloses a method for the recovery of lower alcohols from aqueous solutions using tertiary alkyl phosphine oxides in which the alkyl group is 4–18 carbon atoms. The use of symmetrical branched and unbranched phosphine oxides is disclosed, as is the use of unbranched and branched unsymmetrical phosphine oxides. The use of combinations of symmetrical branched phosphine oxides with unsymmetrical unbranched or branched phosphine oxides is not disclosed. The compound n-hexyl-bis(2,4,4-trimethylpentyl)phosphine oxide is disclosed but no suggestion is made that such a compound can or should be combined with other phosphine oxides, especially symmetrical branched tertiary phosphine oxides, to extract tin from aqueous acid solutions.

In European Patent Application No. 113,912, published July 25, 1984, Bright discloses a process for the selective extraction of rhenium metal from aqueous sulfuric acid solutions using branched symmetrical tertiary phosphine oxide extractant compounds, e.g., tris(2,4,4-trimethylpentyl) phosphine oxide. However, no mention is made as to its usefulness for the selective extraction of tin or other Group IVA metals from acidic leach solutions, either alone or in further combination with unsymmetrical phosphine oxides.

It has now been unexpectedly discovered that solvents comprising branched tertiary phosphine oxides with at least two branches per saturated alkyl group are quite useful, in fact, more useful than conventional TOPO solvents, in selectively extracting tin from acidic leach solutions. These branched tertiary phosphine oxides can be employed alone or preferably in further combination with unsymmetrical tertiary phosphine oxides, phase modifying agents, diluents, etc., and are applicable to a great number of acidic leach solutions, e.g., scrap or ore, concentrates, and plating baths, which contain other metal cations, such as zinc(III), iron(II), iron(III), copper(II) and lead(II).

It has also been unexpectedly found that the tin-loaded solvents can be substantially stripped of tin by contacting with an effective amount of a stripping agent comprising an alkali earth metal hydroxide.

SUMMARY OF THIS INVENTION

In accordance with the present invention there is provided a process for the selective extraction of tin from aqueous acid solutions, which process comprises (1) contacting said aqueous acid solution with a branched tertiary phosphine oxide extractant compound having the formula:

$R_3P=O$ wherein R selected from the group consisting of alkyl of from about 6 to about 16 carbon atoms and wherein R comprises at least two branches per alkyl group, alone, or in further combination with an unsymmetrical tertiary phosphine oxide compound of the formula:

wherein $R^1$, $R^2$ and $R^3$ are each independently selected from alkyl groups of from about 6 to about 16 carbon atoms, and at least one of the $R^1$, $R^2$ and $R^3$ groups being different from the other said groups; (2) separating the resulting phosphine oxide-tin complex from said aqueous solution; and (3) recovering the tin from said complex.

Further provided by this invention are processes for recovering tin from a tertiary phosphine oxide-tin complex which comprises contacting said complex, above-defined, with an aqueous solution of an alkali metal hydroxide, and recovering the tin from the aqueous solution.

In a preferred major aspect, the present invention comtemplates metal extractant compositions comprising in combination a symmetrical branched phosphine oxide compound of the formula

$R_3P=O$ wherein R is selected from the group consisting of alkyl groups of from about 6 to about 16 carbon atoms and wherein R comprises at least two branches per alkyl group and an unsymmetrical phosphine oxide of the formula

wherein $R^1$, $R^2$ and $R^3$ are each, independently selected from the group consisting of alkyl groups of from about 6 to about 16 carbon atoms and at least one of the $R^1$, $R^2$ and $R^3$ groups being different from the other said groups.

DETAILED DESCRIPTION OF THE INVENTION

The symmetrical branched tertiary phosphine oxides that are useful in the present invention are those represented by the formula:
$R_3P=O$ wherein R is selected from the group consisting of alkyl groups of from about 6 to about 16 carbon atoms and wherein R comprises at least two branches per saturated alkyl group.

Examples of suitable branched phosphine oxides include but are in no way limited to tris(2,3-dimethylbutyl) phosphine oxide, tris(2,3,3-trimethylbutyl)phosphine oxide, tris(2,4-dimethylpentyl)phosphine oxide, tris(2,4,4-trimethylpentyl)phosphine oxide, tris(2,5,5-trimethylhexyl) phosphine oxide, tris(2,4,4,6,6-pentamethylheptyl)phosphine oxide and tris(2,4,4,6,6,8,8-heptamethylnonyl)phosphine oxide. Preferred is tris(2,4,4-trimethylpentyl) phosphine oxide. The branched tertiary phosphine oxides may be prepared, for example, by reacting the corresponding branched terminal olefin with phosphine in the presence of a free radical initiator, such as azo-bis(isobutyronitrile) (AIBN), to form the tertiary phosphine. The tertiary phosphine is then 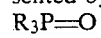 oxidized with hydrogen peroxide to form the corresponding branched tertiary phosphine oxide.

The branched tertiary phosphine oxides may be employed alone or they may be combined with other solvent extraction components. Preferably, the branched tertiary phosphine oxides will be employed in combination with unsymmetrical tertiary phosphine oxides, the latter being of the formula

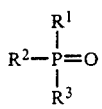

wherein $R^1$, $R^2$ and $R^3$ are each independently, selected from alkyl groups of from about 6 to about 16 carbon atoms, and at least one of the $R^1$, $R^2$ and $R^3$ groups being different from the other said groups. By unsymmetrical is meant that one of the alkyl groups differs in chain length or is linear, as opposed to the other alkyl groups, which are always branched. Examples of suitable unsymmetrical tertiary phosphine oxides include but are not limited to bis(2,3-dimethylbutyl)-n-hexyl phosphine oxide, bis(2,3-dimethylbutyl)-n-heptyl phosphine oxide, bis(2,4,4-trimethylpentyl)-n-octyl phosphine oxide, bis(2,4,4-trimethylpentyl)-n-decyl phosphine oxide, bis(2,4,4,6,6-pentamethylheptyl)-n-dodecyl phosphine oxide, bis(2,4,4-trimethylpentyl)-n-octyl phosphine oxide, bis(2,4,4,6,6,8,8-heptamethylnonyl)-n-dodecyl phosphine oxide, and the like. Preferred is bis(2,4,4-trimethylpentyl)-n-octyl phosphine oxide.

The unsymmetrical tertiary phosphine oxides may be prepared, for example, by first reacting a branched terminal olefin $R^1R^2 C=CH_2$ where $R^1$ is a branched hydrocarbon radical, and $R^2$ is a methyl or ethyl radical, with phosphine in the presence of a free radical initiator to give the secondary branched phosphine $R^1R^2PH$, where $R^1$ and $R^2$ is as defined above. The secondary phosphine is next reacted with a terminal olefin $R^3CH=CH$ where $R^3$ is a linear or branched hydrocarbon radical, in the presence of a free radical initiator to give the corresponding unsymmetrical tertiary phosphine $R^1R^2R^3P$. The latter is oxidized with hydrogen peroxide to give the corresponding unsymmetrical tertiary phosphine oxide.

The branched terminal olefin corresponding to groups $R^1$ and $R^2$ and the branched or linear terminal olefin corresponding to group $R^3$ can be reacted in molar ratios of about 2:1, respectively, to yield the unsymmetrical tertiary phosphine oxides.

In formulating the extractant compound, it is preferred to employ the symmetrical branched tertiary phosphine oxides and the unsymmetrical tertiary phosphine oxides in ratios of the former to the latter of from about 1:25 to about 1:2, more preferably 1:20 to about 1:5.

In addition to the unsymmetrical tertiary phosphine oxides, which are preferred, other components may optionally be used in conjunction with the tin-extracting symmetrical branched tertiary phosphine oxides of this invention.

A phase modifier may be employed to facilitate the separation of organic and aqueous layers of metal bearing acidic leach solution. The phase modifier may be a long or short chain alcohol, aliphatic or aromatic, branched or linear, comprising from about 6 to about 20 carbon atoms. Examples of suitable alcohols include illustratively, isodecanol, tridecanol, and p-nonylphenol. Alternatively, the phase modifier may comprise alkyl phosphates, preferably trialkyl phosphates, such as tributyl phosphate.

A water-immiscible hydrocarbon solvent may be also employed as a diluent in the novel process of this invention. These diluents may be aromatic or aliphatic petroleum distillates. Examples of such solvents include illustratively toluene, xylene, kerosene and cyclohexane or a mixture of any of the foregoing. Preferred as the hydrocarbon diluent is an aliphatic de-aromatized solvent, such as Exxsol® D-80, available from Exxon Company, U.S.A.

The symmetrical branched tertiary phosphine oxide may comprise an amount of from about 2 to about 90 parts by volume of the water-immiscible hydrocarbon diluent, preferably from about 5 to about 50 parts by volume.

When the unsymmetrical tertiary phosphine oxides are employed in combination with the symmetrical branched tertiary phosphine oxides, the amount of these two compounds, together per hydrocarbon solvent, will comprise from about 2 to about 90, preferably from about 5 to about 50, parts by volume.

The tin bearing acidic leach solution will have a hydrochloric acid normality in the range of from about 0.1 to about 8, preferably from about 0.5 to about 6, and most preferably from about 1 to about 3. The average acid solution may possess in addition to tin, other metal cations such as zinc(II), iron(II), iron(III), copper(IV) and lead(II). As will be exemplified in the next section, the novel compositions of this invention will extract at a much higher level, that is, the extraction coeefficient for tin E, is higher than for any of the aforementioned metal cations. The extraction coefficient for any metal may be conveniently calculated by analyzing the extracted tin complex after separation from the aqueous phase. The concentration of tin in the organic phase can be calculated by mass balance. The efficiency of the extractant compound may be determined conveniently by calculating the extraction coefficient for each metal ion, which can be represented as the ratio:

$$E = \frac{M \text{ conc. (org)}}{M \text{ conc. (aq)}}$$

where M conc.(org) is the equilibrium metal concentration in the organic phase and M conc.(aq) is the equilibrium metal concentration in the aqueous phase.

Contacting the acidic leach solution with the solvent should be carried out at a temperature of from about 10° to about 90° C., preferably from about 20° to about 60° C.

Contacting the acidic leach solution with the tertiary phosphine oxide(s) may be performed by techniques well-known to those skilled in this art. A variety of techniques and equipment normally suitable for liquid extraction process may be used in this invention. For example, mixer settlers or columns, such as the reciprocating-plate extraction column or pulse-type column, may be used to agitate the acidic solution and the solvent. In addition, the above described phosphine oxides, symmetrical branched and unsymmetrical, may be supported on solid inert support materials, such as diatomaceous earth or polymeric beads of cross-linked polystyrene. The latter may further comprise styrene-divinylbenzene copolymer.

After contacting has been performed, the resulting phosphine oxide-tin complex can be recovered from the aqueous acidic solution by the conventional methods described above. The tin can be recovered from the phosphine oxide-tin complex by contacting with an aqueous alkali metal hydroxide solution which acts to "strip" or remove tin from the "loaded" solvent. Suitable as the metal hydroxide is sodium hydroxide, potassium hydroxide and lithium hydroxide, or a mixture of any of the foregoing. Preferred is sodium hydroxide.

Soluble inorganic salts may be used in combination with the metal hydroxide. A number of such salts can be so employed including for purposes of illustration, sodium carbonate, ammonium sulfate, potassium carbonate and potassium sulfate, or mixtures of any of the foregoing salts. Preferred as the soluble inorganic salt is sodium carbonate.

In recovering tin from the tin-metal complex, the alkali metal hydroxide may comprise an amount of from about 2 to about 20 parts by weight and the soluble inorganic salt may comprise from about 2 to about 10 parts by weight based on the total composition of the solution. Stripping or recovery of tin from the complex can be carried out at temperatues of from about 20° to about 80° C., preferably 20° to about 60° C.

DESCRIPTION OF THE PREFERRED EMBODIMENTS

The following examples illustrate the novel processes and compositions of this invention. They are not intended to be construed to limit the invention in any manner whatsoever.

EXAMPLE 1

In a one-gallon autoclave, 500 grams of diisobutylene were reacted with 500 psig phosphine to which mixture was added 1,200 grams of a solution containing 30 grams azo-bis (isobutyronitrile) (AIBN) in diisobutylene at 85° C. for 10 hours. The reaction mixture was subjected to vacuum stripping to remove unreacted diisobutylene and mono 2,4-4-trimethylpentylphosphine. The residue was then reacted with 50% molar excess 1-octene in the presence of 1 mole AIBN free radical initiator at 80° C. for 6 hours. Unreacted n-octene was removed by vacuum distillation and the residue containing a mixture of mostly 80–85% bis(2,4,4-trimethylpentyl)-n-octyl and 12–15% tris(2,4,4-trimethylpentyl)phosphine was converted to the corresponding mixture of symmetrical branched and unsymmetrical branched tertiary phosphine oxides by reacting with 25% hydrogen peroxide at 50°–60° C. The mixture is useful as a metal extractant composition.

EXAMPLE 2

The diisobutylene-phosphine reaction product of Example 1 is reacted with 1-dodecene, instead of 1-octene to give a mixture of predominantly bis(2,4,4-trimethylpentyl)-n-dodecyl phosphine and tris(2,4,4-trimethylpentyl)phosphine, which on oxidation with hydrogen peroxide, is converted to the corresponding mixture of symmetrical branched and unsymmetrical branched tertiary phosphine oxides, useful as a metal extractant composition.

EXAMPLE 3

Triisobutylene is reacted with phosphine according to Example 1 and the reaction mixture is subjected to vacuum stripping to remove unreacted triisobutylene and mono 2,4,4,6,6-pentamethylheptylphosphine. The residue is reacted with 1-dodecene according to Example 1 and a mixture is obtained of predominantly bis(2,4,4,6,6-pentamethylheptyl)-ndodecylphosphine and tris(2,4,4,6,6-pentamethylheptyl) phosphine. The above mixture is oxidized with hydrogen peroxide and the corresponding mixture of symmetrical branched and unsymmetrical branched tertiary phosphine oxides is obtained, useful as a metal extractant commposition.

EXAMPLE 4

2,3-dimethyl-1-butene is reacted with phosphine according to Example 1 and the reaction mixture is subjected to vacuum stripping to remove unreacted 2,3-dimethyl-1-butene and mono 2,3-dimethylbutyl phosphine. The residue is reacted with 1-hexene to give a mixture of mostly bis(2,3-dimethylbutyl)-n-hexyl phosphine and tris (2,3-dimethylbutyl) phosphine, which on oxidation with hydrogen peroxide is converted to the corresponding symmetrical branched and unsymmetrical branched tertiary phosphine oxides, useful as a metal extractant composition.

EXAMPLE 5-10

Six 40 ml aliquots of a 0.15 moles per liter solution of tris(2,4,4-trimethylpentyl)phosphine oxide in an aliphatic hydrocarbon diluent, Exxsol®D-80, were shaken with equalvolumes of hydrochloric acid solutions of varying acidities (1N to 6N) containing 0.01 moles per liter stannic chloride, for five minutes at 24° C. The organic phase containing the extracted tin complex was separated from the aqueous phase, the latter phase was analyzed for tin. The concentration of tin in the organic phase was calculated by mass balance. The efficiency of the tris(2,4,4-trimethylpentyl)phosphine oxide was determined by calculating the extraction coefficient for the metal ion. Using the above procedure, extraction coefficients, E, for Fe(II), Fe(III), Zn(II), Pb(II) and Cu(II) were also determined with the above tris(2,4,4-trimethylpentyl) phosphine oxide as the solvent extraction reagent and the appropriate metal halide solutions. Results are set forth in Table 1.

TABLE 1

Selective Extraction of Tin From Aqueous Acid Solution Using Tris(2,4,4-trimethylpentyl) Phosphine Oxide

| | Example | | | | | |
|---|---|---|---|---|---|---|
| | 5 | 6 | 7 | 8 | 9 | 10 |
| | Initial HCl Normality | | | | | |
| | 1 | 2 | 3 | 4 | 5 | 6 |
| | Extraction Coefficient; E | | | | | |
| $Sn^{4+}$ | 396 | * | * | * | * | * |
| $Fe^{3+}$ | 0.15 | 2.4 | 92 | 221 | 700 | 640 |
| $Fe^{2+}$ | 0 | 0.027 | 0.098 | 0.17 | 0.19 | 0.28 |
| $Zn^{2+}$ | 0.60 | 1.7 | 2.7 | 4.1 | 11 | 15 |
| $Pb^{2+}$ | 1.4 | 0.97 | 0.36 | 0.0064 | 0.0094 | 0.017 |
| $Cu^{2+}$ | 0 | 0.015 | 0.021 | 0.069 | 0.24 | 0.86 |

*Quantitative extraction observed, E = infinity

The results above indicate that higher extraction coefficients are obtained for tin relative to other metals by using a symmetrical branched tertiary phosphine oxide in accordance with this invention.

EXAMPLES 11-16

Using the procedure of Examples 5-10, 40 ml aliquots of 0.15 M solutions of the symmetrical branched and unsymmetrical branched phosphine oxide mixture prepared in Example 1, in aliphatic hydrocarbon diluent were shaken with equal volumes of varying acidity (1N to 6N) hydrochloric acid solutions containing respectively, 0.01 moles per liter Sn(IV), Fe(II), Fe(III), Zn(II), and Pb(II) halides. The aqueous phase in each metal extraction was separated from the organic phase and analyzed for the metal content. The metal concentration in the organic phase was calculated by mass balance and the extraction coefficients for each of the metals above were calculated. Results are set forth in Table 2.

TABLE 2

Selective Extraction of Tin from Aqueous Acid Solution Using Tris (2,4,4-trimethylpentyl) Phosphine Oxide and Bis (2,4,4-trimethylpentyl)-n-Octyl Phosphine Oxide

| | Example | | | | | |
|---|---|---|---|---|---|---|
| | 11 | 12 | 13 | 14 | 15 | 16 |
| | Initial HCl Normality | | | | | |
| | 1 | 2 | 3 | 4 | 5 | 6 |
| | Extraction Coefficient, E | | | | | |
| $Sn^{4+}$ | * | * | * | * | * | * |
| $Fe^{3+}$ | 0.52 | 35 | 810 | 1,150 | 5,000 | 3,930 |
| $Fe^{2+}$ | 0 | 0.082 | 0.16 | 0.18 | 0.22 | 0.53 |
| $Zn^{2+}$ | 5.9 | 20 | 68 | 185 | 250 | 164 |
| $Pb^{2+}$ | 0.98 | 1.4 | 0.46 | 0.077 | 0.084 | 0.077 |

*Quantitative extraction observed, E = infinity

The results above show that tin can be selectively and efficiently extracted from an aqueous acid solution using a combination of a symmetrical branched tertiary phosphine oxide and an unsymmetrical tertiary phosphine oxide in accordance with this invention.

COMPARATIVE EXAMPLES 5A-10A

For comparison purposes, extraction coefficients for a number of metal cations were obtained following the method of Examples 5-10, but using tri-n-octyl phosphine oxide (TOPO) in place of tris(2,4,4-trimethylpentyl) phosphine oxide. Results are given in Table 3.

TABLE 3

Selective Extraction of Tin From Aqueous Acid Solution Using Tri-n-octyl Phosphine Oxide

| | Comparative Example | | | | | |
|---|---|---|---|---|---|---|
| | 5A | 6A | 7A | 8A | 9A | 10A |
| | Initial HCl Normality | | | | | |
| | 1 | 2 | 3 | 4 | 5 | 6 |
| | Extraction Coefficient | | | | | |
| $SN^{4+}$ | * | * | * | * | * | * |
| $Fe^{3+}$ | 9.8 | 330 | 1,790 | 2,610 | 5,740 | * |
| $Fe^{2+}$ | 0.099 | 0.51 | 0.35 | 0.35 | 0.45 | 0.96 |
| $Zn^{2+}$ | 70 | 620 | 3,100 | 3,100 | 1,600 | 690 |
| $Pb^{2+}$ | 1.5 | 1.4 | 0.79 | 0.43 | 0.24 | 0.11 |
| $Cu^{2+}$ | 1.4 | 1.9 | 2.8 | 4.5 | 12.5 | 16.1 |

*Quantitative extraction observed, E = infinity

A comparison of the extraction coefficient data in Tables 1, 2, and 3 indicates that although all three phosphine oxides, including conventional TOPO, are very efficient extractants for tin, the branched tertiary phosphine oxides of this invention are less efficient extractants for the other metals, namely Fe(III), Fe(II), Zn(II), Pb(II) and Cu(II), and are, therefore, more selective for tin. The tin extraction selectivity for tris(2,4,4-trimethylpentyl) phosphine oxide and the mixture of bis(2,4,4-trimethylpentyl)-n-octylphosphine oxide/tris (2,4,4-trimethylpentyl) phosphine oxide can be illustrated quantitatively by calculating the relative extraction coefficients of the above two branched phosphine oxides against TOPO for each of the various metals shown above. This is shown in the following equation:

$$\text{Relative Extraction Coefficient } RE(M) = \frac{Em \text{ Compounds of this invention}}{Em \text{ TOPO}}$$

where Em=the extraction coefficient of the solvent extractant compound for metal m. Calculation of RE(M) valves for each of Examples 5-16 are set forth in Table 4.

TABLE 4

Relative Extraction Coefficient Re(M) Calculated for Examples 5-16

| RE(M) Values | Examples |  |  |  |  |  |  |  |  |  |  |  |
|---|---|---|---|---|---|---|---|---|---|---|---|---|
|  | 5 | 6 | 7 | 8 | 9 | 10 | 11 | 12 | 13 | 14 | 15 | 16 |
| $Zn^{2+}$ | 0.0086 | 0.0027 | 0.00087 | 0.0013 | .0069 | 0.022 | 0.084 | 0.032 | 0.022 | 0.060 | 0.16 | 0.24 |
| $Fe^{3+}$ | 0.015 | 0.0072 | 0.051 | 0.085 | 0.12 | — | 0.05 | 0.11 | 0.45 | 0.44 | 0.87 | — |
| $Cu^{2+}$ | 0 | 0.0079 | 0.00075 | 0.015 | 0.019 | 0.053 | — | — | — | — | — | — |
| $Fe^{2+}$ | 0 | 0.053 | 0.28 | 0.484 | 0.42 | 0.29 | 0 | 0.16 | 0.45 | 0.51 | 0.488 | 0.522 |
| $Pb^{2+}$ | 0.93 | 0.69 | 0.45 | 0.015 | 0.039 | 0.154 | 0.653 | 1.00 | 0.582 | 0.179 | 0.636 | — |

The results indicate that in practically all cases the relative extraction coefficients for each of the compounds of this invention are less than one indicating lower extractability and therefore greater selectivity for the impurity metal involved.

In the next section, stripping of a tin-loaded compound was carried out.

EXAMPLES 17-22

A tin loaded solvent extractant solution was prepared by shaking equal volumes of a solution of 65 grams per liter of the tertiary phosphine oxide mixture of Example 1, in Exxsol ®D-80 aliphatic hydrocarbon solvent with an aqueous solution of tin(IV) chloride in 1N hydrochloric acid. Aliquots of the organic phase, i.e., loaded solvent containing 1.575 grams per liter (gpl) Sn(IV) were shaken with aliquots of aqueous solutions of 2N sodium hydroxide containing 55 grams per liter sodium carbonate for five minutes at 24° C. at various aqueous to organic (A/O) volume ratios. The aqueous phase was separated and analyzed for tin. Results are set forth in Table 5.

TABLE 5

Recovery of Tin From Tin-Loaded Tris (2,4,4-trimethylpentyl) Phosphine Oxide/Bis (2,4,4-trimethylpentyl) Phosphine Oxide Mixture

|  | Example |  |  |  |  |  |
|---|---|---|---|---|---|---|
|  | 17 | 18 | 19 | 20 | 21 | 22 |
| A/O Ratio | 0.2 | 0.5 | 1 | 2 | 5 | 10 |
| Sn Equilibr. Conc. Aqueous (gpl) | 4.950 | 2.200 | 1.120 | 0.600 | 0.275 | 0.138 |
| Organic (gpl) | 0.585 | 0.475 | 0.455 | 0.375 | 0.200 | 0.195 |
| Percent Stripped | 62.9 | 69.8 | 71.1 | 76.2 | 87.3 | 87.6 |

The results above indicated that tin can be effectively removed from the complex in accordance with this invention.

EXAMPLES 23-28

The procedure of Examples 17-22 was repeated except that the shake-outs at the various A/O ratios were carried out at 50° C. Results are given in Table 6.

TABLE 6

Recovery of Tin from Tin-Loaded Tris (2,4,4-trimethylpentyl) Phosphine Oxide/Bis (2,4,4-trimethylpentyl)-n-octylphosphine oxide Mixture

|  | Examples |  |  |  |  |  |
|---|---|---|---|---|---|---|
|  | 23 | 24 | 25 | 26 | 27 | 28 |
| A/O | 0.2 | 0.5 | 1 | 2 | 5 | 10 |
| Sn Equil. Conc. Aqueous (gpl) | 7.500 | 3.050 | 1.475 | 0.740 | 0.300 | 0.140 |
| Organic (gpl) | 0.075 | 0.050 | 0.100 | 0.095 | 0.075 | 0.175 |
| Percent Stripped | 95.2 | 96.8 | 93.7 | 94.0 | 95.2 | 88.9 |

The results given above show that tin can be effectively removed and recovered from the complex in accordance with this invention.

EXAMPLES 29-34

The procedure of Examples 23-28 was repeated except that 5% isodecanol was added as a phase modifier to the tin loaded compound. Results are given in Table 7.

TABLE 7

Recovery of Tin from Tin-loaded Tris(2,4,4-trimethylpentyl) Phosphine Oxide/bis(2,4,4-trimethylpentyl)-n-octyl phosphine oxide and 5% Isodecanol

|  | Example |  |  |  |  |  |
|---|---|---|---|---|---|---|
|  | 29 | 30 | 31 | 32 | 33 | 34 |
| A/O Ratio | 0.2 | 0.5 | 1 | 2 | 5 | 10 |
| Sn Equil. Conc. Aqueous (gpl) | 6.650 | 2.617 | 1.350 | 0.690 | 0.285 | 0.146 |
| Organic (gpl) | 0.242 | 0.264 | 0.222 | 0.192 | 0.147 | 0.112 |
| Percent Stripped | 84.0 | 83.2 | 85.9 | 87.8 | 90.6 | 92.9 |

EXAMPLES 35-40

Using the procedure of Examples 11-16 but substituting in place of tris(2,4,4-trimethylpentyl) phosphine oxide, and bis(2,4,4-trimethylpentyl)-n-octyl phosphine oxide, the mixture of branched tertiary phosphine oxides prepared in Example 2, tin can be selectively extracted from aqueous acid solutions in accordance with the present invention.

EXAMPLES 41-46

Using the procedure of Examples 11-16 but substituting in place of tris (2,4,4-trimethylpentyl) phosphine oxide and bis(2,4,4-trimethylpentyl)-n-octyl phosphine oxide, the mixture of branched tertiary phosphine oxides prepared in Example 3, tin can be selectively extracted from aqueous acid solution in accordance with this invention.

EXAMPLES 47-52

Using the procedure of Examples 11-16 but using in place of tris (2,4,4-trimethyl-pentyl) phosphine oxide and bis (2,4,4-trimethylpentyl)-n-octyl phosphine oxide, the mixture of branched tertiary phosphine oxides prepared in Example 4, tin is selectively extracted from aqueous acid solutions in accordance with this invention.

The data above indicate that good separation and recovery of tin from aqueous acid solution are obtained in accordance with this invention.

The above patents and publications are incorporated herein by reference.

Many variations will suggest themselves to those skilled in the art in light of the above, detailed description. For example, instead of using tris(2,4,4-trimethylpentyl)phosphine oxide or a mixture of tris(2,4,4-trimethylpentyl)phosphine oxide and bis(2,4,4-trimethylpentyl)-n-octyl-phosphine oxide as the extractant compounds, other symmetrical branched tertiary phosphine oxides, such as tris(2,3-dimethylbutyl) phosphine oxide, tris(2,3,3-trimethylbutyl)phosphine oxide, tris(2,4,4,6,6-pentamethylheptyl)phosphine oxide, or a mixture of any of the foregoing can be used. Instead of bis(2,4,4-trimethylpenty)-n-octyl phosphine oxide as the unsymmetrical tertiary phosphine oxide, other compounds such as bis(2,3-dimethylbutyl)-n-heptyl phosphine oxide, bis(2,4,4-trimethylpentyl)-n-dodecyl phosphine oxide, bis(2,4,4,6,6-pent-amethylheptyl)-n-dodecyl phosphine oxide di-n-hexyl-n-octyl phosphine oxide, or a mixture of any of the foregoing can be used. Instead of isodecanol as a phase modifying agent other compounds such as tributylphosphate, tridecanol, and p-nonylphenol, or a mixture of any of the foregoing can be employed. Instead of using an aliphatic hydrocarbon diluent, other diluents such as toluene, xylene or kerosene can be employed. Instead of using sodium hydroxide to strip or recover tin from the loaded solvent, other metal hydroxides such as potassium hydroxide or lithium hydroxide, can be used. Instead of sodium carbonate as the soluble inorganic salt, other salts, such as ammonium sulfate, potassium carbonate and potassium sulfate can be used. All such obvious variations are within the full scope of the appended claims.

We claim:

1. A process for the selective extraction of tin from aqueous acid solutions to the substantial exclusion of other metals present, which process comprises (1) contacting said aqueous acid solution with an extractant composition comprising a branched phosphine oxide compound having the formula:

$$R_3P=O$$

wherein R is selected from the group consisting of alkyl of from about 6 to about 16 carbon atoms and wherein R comprises at least two branches per alkyl group, alone, or in further combination with an unsymmetrical phosphine oxide compound of the formula:

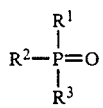

wherein $R^1$, $R^2$ and $R^3$ are each independently selected from alkyl groups of from about 6 to about 16 carbon atoms, and at least one of the $R^1$, $R^2$ and $R^3$ groups being different from the other said groups; (2) separating the resulting phosphine oxide—tin complex from said aqueous solution; and (3) recovering the tin from said complex.

2. A process as defined in claim 1 wherein said branched phosphine oxide is selected from tris (2,3-dimethylbutyl)phosphine oxide, tris(2,3-trimethylbutyl)phosphine oxide, tris(2,4-dimethylpentyl)phosphine oxide, tris(2,4,4-trimethylpentyl)phosphine oxide, tris(2,5,5-trimethylhexyl)phosphine oxide, tris(2,4,4,6,6-pentamethylheptyl) phosphine oxide, or a mixture of any of the foregoing.

3. A process as defined in claim 2 wherein said branched tertiary phosphine oxide comprises tris(2,4,4-trimethylpentyl)phosphine oxide.

4. A process as defined in claim 1 wherein said unsymmetrical phosphine oxide is selected from bis(2,3-dimethylbutyl)-n-hexyl phosphine oxide, bis(2,3-dimethylbutyl)-n-heptyl phosphine oxide, bis(2,4,4 trimethylpentyl)-n-dodecyl phosphine oxide, bis(2,4,4,6,6 pentamethylheptyl)-n-dodecyl phosphine oxide or a mixture of any of the foregoing.

5. A process as defined in claim 4 wherein said unsymmetrical phosphine oxide comprises bis(2,4,4-trimethylpentyl)-n-octyl phosphine oxide.

6. A process as defined in claim 1 wherein said branched phosphine oxide comprises tris(2,4,4-trimethylpentyl)phosphine oxide and said unsymmetrical tertiary phosphine oxide comprises bis(2,4,4-trimethylpentyl)-n-octyl phosphine oxide.

7. A process as defined in claim 1 wherein said branched phosphine oxide is further combined with a phase modifying agent comprising an alcohol or triakylphosphate.

8. A process as defined in claim 1 wherein said branched phosphine oxide compound is dissolved in a water-immiscible hydrocarbon diluent.

9. A process as defined in claim 1 wherein the step of recovering tin from a tertiary phosphine oxide-tin complex comprises contacting said complex with an aqueous solution of an alkali metal hydroxide and recovering the tin from said aqueous solution.

10. A process as defined in claim 9 wherein said metal hydroxide is sodium hydroxide.

11. A process as defined in claim 9 wherein said alkali metal hydroxide is combined with a soluble inorganic salt selected from sodium carbonate, ammonium sulfate, potassium carbonate, and potassium sulfate, or a mixture of any of the foregoing.

12. A process as defined in claim 11 wherein said soluble inorganic salt comprises sodium carbonate.

* * * * *